(12) United States Patent
Watkinson et al.

(10) Patent No.: US 9,364,812 B2
(45) Date of Patent: Jun. 14, 2016

(54) FREEBOARD TAR DESTRUCTION UNIT

(75) Inventors: Alan Paul Watkinson, Vancouver (CA); Yong Hua Li, Vancouver (CA); Cef Haligva, Surrey (CA)

(73) Assignee: HIGHBURY BIOFUEL TECHNOLOGIES INC., Vancouver (CA)

( * ) Notice: Subject to any disclaimer, the term of this patent is extended or adjusted under 35 U.S.C. 154(b) by 389 days.

(21) Appl. No.: 13/885,468

(22) PCT Filed: Nov. 17, 2011

(86) PCT No.: PCT/CA2011/050717
§ 371 (c)(1),
(2), (4) Date: May 15, 2013

(87) PCT Pub. No.: WO2012/065272
PCT Pub. Date: May 24, 2012

(65) Prior Publication Data
US 2013/0230433 A1 Sep. 5, 2013

Related U.S. Application Data

(60) Provisional application No. 61/414,595, filed on Nov. 17, 2010.

(51) Int. Cl.
*B01J 19/24* (2006.01)
*C10J 3/84* (2006.01)
(Continued)

(52) U.S. Cl.
CPC *B01J 19/24* (2013.01); *B01J 6/008* (2013.01); *B01J 8/0207* (2013.01); *B01J 8/0242* (2013.01); *B01J 8/0403* (2013.01); *B01J 8/0446* (2013.01); *C10J 3/482* (2013.01); *C10J 3/84* (2013.01); *C10K 3/008* (2013.01); *B01J 2219/0004* (2013.01); *B01J 2219/00006* (2013.01); *C10J 2200/06* (2013.01); *C10J 2300/0916* (2013.01); *C10J 2300/0976* (2013.01); *C10J 2300/12* (2013.01); *C10J 2300/1606* (2013.01); *C10J 2300/1637* (2013.01); *C10J 2300/1807* (2013.01); *Y02P 20/145* (2015.11)

(58) Field of Classification Search
CPC .......................... C10J 3/84; C10J 2300/1637
See application file for complete search history.

(56) References Cited

U.S. PATENT DOCUMENTS 4,497,637 A 2/1985 Purdy et al.
4,568,362 A * 2/1986 Deglise et al. .................. 48/209
(Continued)

FOREIGN PATENT DOCUMENTS

CA 2719382 A1 10/2009
JP 55-161887 A 12/1980
(Continued)

OTHER PUBLICATIONS

Milne, T.A. et al., "Biomass Gasifier 'Tars': Their Nature, Formation, and Conversion", NREL/TP-570-25357 (Nov. 1998).
(Continued)

*Primary Examiner* — Matthew Merkling
(74) *Attorney, Agent, or Firm* — Harness, Dickey & Pierce, P.L.C.

(57) ABSTRACT

A tar destruction unit for a biomass gasifier is described, comprising a catalyst and/or heating means situated within the free-board section of the gasifier. Also described is a biomass gasifier having such a tar destruction unit.

17 Claims, 9 Drawing Sheets

(51) Int. Cl.
*C10J 3/48* (2006.01)
*C10K 3/00* (2006.01)
*B01J 6/00* (2006.01)
*B01J 8/02* (2006.01)
*B01J 8/04* (2006.01)

(56) References Cited

U.S. PATENT DOCUMENTS

| | | | | |
|---|---|---|---|---|
| 4,865,625 A * | 9/1989 | Mudge et al. | | 48/197 R |
| 5,213,587 A | 5/1993 | Ekstrom et al. | | |
| 8,007,688 B2 * | 8/2011 | Dahlin et al. | | 252/373 |
| 2006/0265954 A1 | 11/2006 | Dogru et al. | | |
| 2008/0244976 A1 | 10/2008 | Paisley | | |
| 2009/0090053 A1 | 4/2009 | Feldmann | | |
| 2010/0223848 A1 * | 9/2010 | Heidenreich et al. | | 48/87 |
| 2012/0217440 A1 * | 8/2012 | Tetzlaff | B01J 8/0055 | 252/373 |

FOREIGN PATENT DOCUMENTS

| | | |
|---|---|---|
| JP | 61-106696 A | 5/1986 |
| JP | 2004-292720 A | 10/2004 |

OTHER PUBLICATIONS

International Search Report for PCT/CA2011/050717, mailed Mar. 9, 2012, ISA/CA.

* cited by examiner

PRIOR ART

PRIOR ART

PRIOR ART

PRIOR ART

Figure 5b                               PRIOR ART

FREEBOARD TAR DESTRUCTION UNIT

RELATED APPLICATIONS

This application is a 371 U.S. National Stage of International Application No. PCT/CA2011/050717, filed on Nov. 17, 2011, which claims priority from, and is related to, U.S. Patent application 61/414,595, filed Nov. 17, 2010, the contents of which are hereby incorporated by reference herein in their entirety.

BACKGROUND OF THE INVENTION

Generation of tar is a ubiquitous problem in production of fuel and synthesis of gas from biomass. Some gasifier systems produce gases high in tar concentrations, whereas others produce gases low in tars. Depending on the application of the produced gas, different extents of tar removal are required. For example, burning the produced gas in some industrial units, such as glass melting furnaces, can tolerate higher tar concentrations, than can other applications, such as lime kiln burners, which require much lower tar content in the gas they burn. Using the gas to produce electricity, such as in a gas turbine or a gas engine, requires that tar concentrations must be significantly lower than in most industrial burners. The most demanding specifications with regards to tar content are for catalytic conversion of syngas, where gas must contain extremely low concentrations of tars.

Thus, when producing fuel gas from biomass, it is usually desired to remove the tar. When producing synthesis gas, tar reduction is essential. Tars can be either captured and removed from the gas by physical methods, or converted to useful components by chemical reactions.

Physical methods for removal or reduction of tar include tar capture through scrubbing the gas with water, as described in US Patent publication 2006/0265954 (incorporated herein by reference) or as practiced by FERCO (Paisley M A et al., Proc. ASME Turbo Expo., June 2001), or with oils or other liquids as described in U.S. Pat. No. 4,497,637 (incorporated herein by reference). Physical methods also include passing the gas through an electrostatic precipitator or a filter, which have varied efficiency (Milne T A et al, NREL Report NREL/TP-570-25357 (1998), Han & Kim, Renewable & Sustainable Energy Reviews 12:397-416 (2008)).

Chemical methods for removal or reduction of tar are also commonly known. These methods are typically based on thermal reactions of cracking tar into lighter compounds at high temperature (for example, the NREL Thermal cracker, which operates at about 1300° C.), steam reforming of tar in the presence of catalysts (as described in U.S. Pat. No. 5,213,587 and US patent publication 2008/0244976, both incorporated herein by reference), or oxidizing the tar at high temperature (as described in US patent publication 2009/0090053).

In the thermal reaction methods, in general, provided that sufficient residence time is allowed for the reactions to occur, the higher the temperature experienced by the gas, the lower the resultant tar content. Assuming that the temperature is sufficiently high for the reactions to occur, the longer the residence time experienced by the gas, the lower the resultant tar content.

There are two generally practiced ways of thermally treating the gas. Thermal treatment can occur directly in the gasifier, by maintaining the gasifier at very high temperatures (referred to herein as Primary Thermal Treatment). Thermal treatment can also occur in a secondary vessel, referred to herein as Secondary Thermal Treatment. For example, the temperature in the gasifier can be heated to a moderate gasifier temperature, such as 800° C., then gas can be transferred to a secondary vessel for heating to a much higher temperature (for example, 1200° C.).

In the catalytic reaction methods, in general, at a given temperature and time of contact, tar content will be lower in the presence of certain catalysts than in their absence. Longer contact times between the gas and the catalyst, and higher temperatures, generally increase tar conversion (i.e. lower tar content in the gas), though there are usually optimum conditions above which catalytic processes decrease in efficiency.

Many catalysts useful for the catalytic reaction methods are known in the art (see, for example, Han & Kim, Supra and Xu et al, FUEL in press 2010, both incorporated herein by reference). Catalysts are generally classified as either low-cost, natural, or throw-away catalysts such as dolomite, or high-cost, engineered catalytic materials such as nickel-based naphtha stream-reforming catalyst, marketed and sold by chemical catalyst companies for the specific purpose of removing tar from gas or other biomass-derived fuels.

There are two generally practiced ways of adding catalyst. Primary catalytic treatment involves adding catalyst directly to the gasifier. Thus the catalyst is present as the biomass particles are heated up, as they pyrolyse into char, gases and tars, and as the char is gasified. The produced tars undergo the tar cracking and/or reforming in situ. In secondary catalytic treatment, the catalyst is placed in a second reaction vessel, downstream of the gasifier. Thus, the biomass particles are heated up, and pyrolyse into char, gases and tars, and the char is gasified in the gasifier; the gases and tars are then transferred to a second reaction vessel, which contains (or to which is added) catalyst, and where the tar cracking and/or reforming is performed.

Much research has focused on the effects of different materials as catalysts, and on their relative efficiency when applied in primary or secondary treatments. Generally, secondary catalytic treatment is more costly in terms of both capital and operating costs, because it requires an extra vessel and costs for its operation (including heating costs, etc.). However, it can result in greater extent of tar removal as compared to primary treatment. Both primary and secondary treatments can be used together, typically with better results than either type of treatment on its own.

The selection of an appropriate tar reduction treatment depends on a weighing of the disadvantages of each method. Primary thermal treatment in a typical dual-bed steam gasifier requires hotter combustor temperatures, or greater extents of char combustion, in order to increase the gasifier temperature. This requires more fuel to the combustor, and less to the gasifier, reducing the efficiency of the gasification process. On the other hand, secondary thermal treatment requires a second vessel to superheat the gases, resulting in increased capital and operating costs. In primary catalytic treatment, catalyst costs are high, and catalyst can readily degrade by carbon deposition, or by attrition, when present in the gasifier bed. Make-up catalyst is also expensive. Secondary catalytic treatment requires a secondary tar reforming vessel (see for example US 2008/0244976 and U.S. Pat. No. 5,213,587), resulting in additional capital cost. Often, the reforming vessel is very large, and can cost more to build and operate than the gasifier itself (See NREL Report 2007).

SUMMARY OF THE INVENTION

According to one aspect of the present invention is provided a free-board tar destruction unit for a gasifier, comprising: (a) means for affixing to the inside of a free-board section of a gasifier, or in the case of a dual bed gasifier to the inside of either the gasifier vessel or the combustor vessel; and (b) a catalyst.

According to a further aspect of the invention, the free-board tar destruction unit further comprises heating means.

According to another aspect of the present invention is provided a free-board tar destruction unit for a gasifier, comprising: (a) means for affixing to the inside of a free-board section of a gasifier; and (b) heating means.

According to a further aspect of the invention, the free-board tar destruction unit further comprises a catalyst, for example, a catalyst situated within a radial flow catalyst bed, or a catalyst situated within a plurality of flow-through horizontal catalyst compartments, or a catalyst situated within a plurality of bayonet vertical catalyst compartments.

According to a further aspect of the invention, the free-board tar destruction unit comprises catalyst and heating means within a plurality of alternating bayonet vertical compartments.

In another aspect of the present invention is provided a biomass gasifier comprising:
(a) a particle bed section, having, within it, sand or other chemically inert particles;
(b) a free-board section, devoid of the particle bed;
(c) a biomass feeder, capable of feeding biomass into the particle bed section;
(d) a steam feeder, capable of feeding steam into the particle bed section; and
(e) a free-board tar destruction unit as previously described.

BRIEF DESCRIPTION OF FIGURES

FIGS. 1-5b show schematics of prior art biomass gasifiers.

DETAILED DESCRIPTION OF THE PREFERRED EMBODIMENTS

The inventors have discovered that, by placing a catalytic or heat source within the gasifier, but in the free-board (the zone within the gasifier which is above the inert sand bed), one can achieve low tar levels, without some of the disadvantages of the prior art. Specifically, the placement of the catalytic or heat source within the free-board reduces catalytic degradation and results in a decrease in heat cost, respectively.

A tar-destruction unit is therefore described, which is a compact arrangement of catalytic and/or heating surfaces, which can be mounted within the free-board. The free-board tar destruction unit provides many of the benefits of secondary catalytic treatment and secondary thermal treatment without the necessity of constructing a secondary reaction vessel, and its associated economic disadvantages. The free-board tar destruction unit herein described also saves capital and operating costs by combining several functions within the gasifier vessel.

The free-board tar destruction unit can be seen and understood with reference to the figures.

Figure 1:
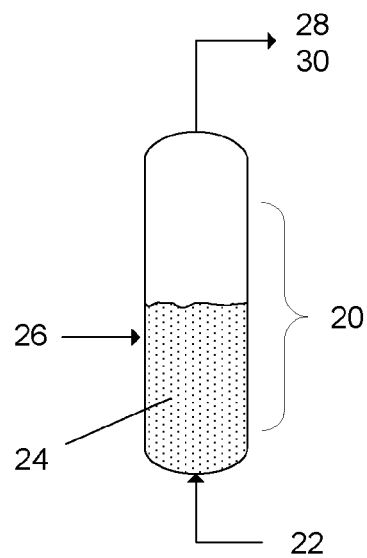

FIG. 1 shows a schematic of a prior art biomass gasifier 20. Steam 22 enters the gasifier and is forced through inert sand bed 24. Biomass 26 is fed into the inert sand bed 24. The gasifier 20 is moderately heated. The heat and steam, at pressure, cause the pyrolysis of the biomass into char, gases 28 and tars 30. A portion of the char is then converted to gas. Raw gas 28 containing tars 30 and fine char eventually exit the gasifier, typically leaving the coarse char behind in the inert sand bed 24. Typically, both fine and coarse char must eventually be recovered to generate heat.

Figure 2:
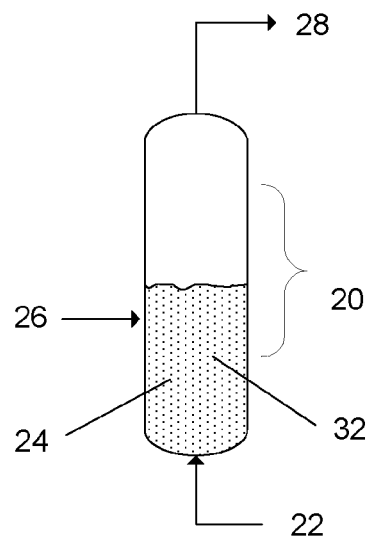

FIG. 2 shows a schematic of a prior art biomass gasifier 20 having a primary catalytic treatment therein. Steam 22 enters the gasifier and is forced through a bed of catalyst 32, or (as shown) a mixed bed consisting of inert sand 24, to which a catalyst 32 has been added. Biomass 26 is fed into the bed of solids. The gasifier 20 is moderately heated. The heat and steam, at pressure, cause the pyrolysis of the biomass into char, gases 28 and tars 30. A portion of the char is then converted to gas. Catalytic cracking and/or steam reforming of the tars 30 occurs within the gasifier, primarily within the mixed bed containing catalyst, creating a lower tar gas 28 which is eventually caused to exit the gasifier. With this method, the catalyst, typically a fine powder, is relatively rapidly destroyed, primarily through contact and grinding with the inert sand bed 24, or the catalyst effectiveness is reduced by deposition of carbon or impurities from the biomass.

Figure 3:
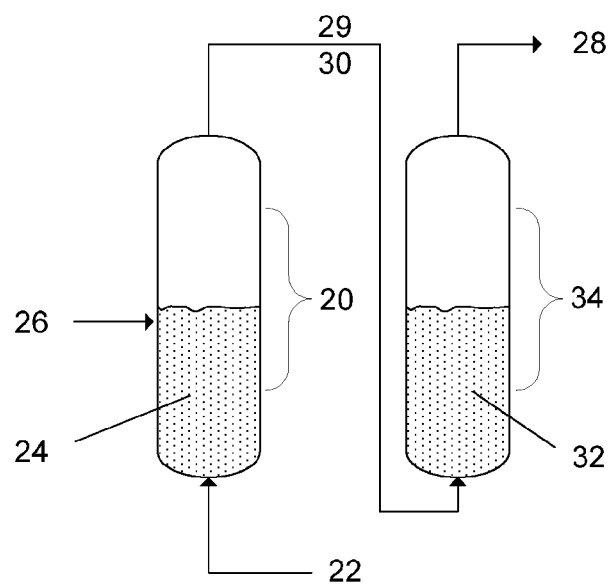

FIG. 3 shows a schematic of a prior art biomass gasifier 20 having a secondary catalytic treatment vessel. Steam 22 enters the gasifier and is forced through inert sand bed, 24. Biomass 26 is fed into the inert sand bed 24. The gasifier 20 is moderately heated. The heat and steam, at pressure, cause the pyrolysis of the biomass into char, gases 28 and tars 30. A portion of the char is then converted to gas. Raw gas 28 containing tars 30 and fine char eventually exit the gasifier, typically leaving the coarse char behind in the inert sand bed 24. Both fine and coarse char must eventually be recovered to generate heat. The raw gas 28 containing tars 30 is transferred to a secondary vessel 34 containing catalyst 32, where catalytic cracking and/or steam reforming of the tars 30 occurs, creating a lower tar gas 28 which is eventually caused to exit the secondary vessel 34.

Figure 4:
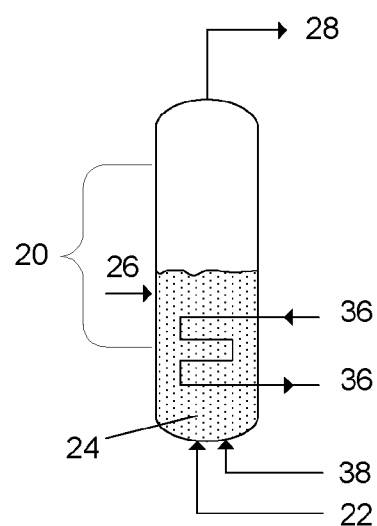

FIG. 4 shows a schematic of a prior art biomass gasifier 20 having a primary thermal treatment therein. Steam 22 enters the gasifier and is forced through inert sand bed 24. Biomass 26 is fed into the inert sand bed 24. Heat 36, or oxygen 38, or both, are also added to the gasifier 20, typically within inert sand bed 24 since that is the main area where gasification takes place. The heat and steam, at pressure, cause the pyrolysis and gasification of the biomass into char, gases 28 and tars 30. Breaking down of the tars 30 occurs within the gasifier due to the addition of heat 36 and/or oxygen 38. A lower tar gas 28 is eventually caused to exit the gasifier.

Figure 5:
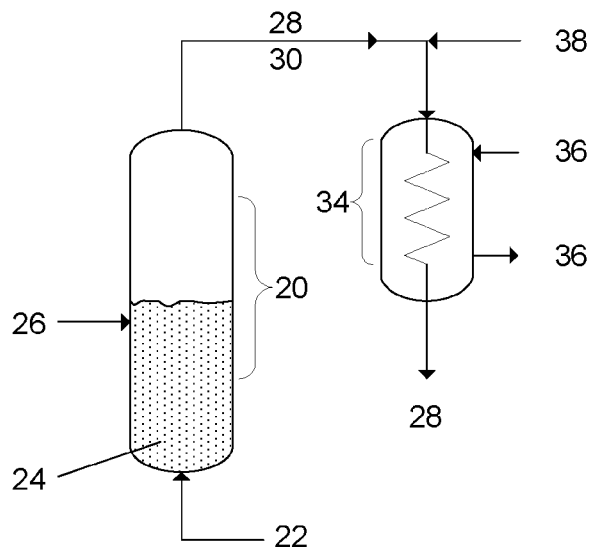
Figure 5:
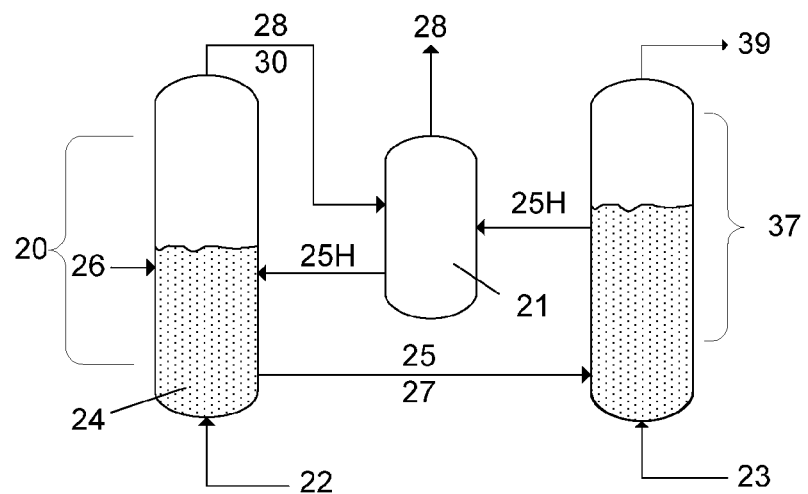

FIG. 5 shows a schematic of a prior art biomass gasifier 20 having a secondary thermal treatment vessel. Steam 22 enters the gasifier 20 and is forced through inert sand bed 24. Biomass 26 is fed into the inert sand bed 24. The gasifier 20 is moderately heated. The heat and steam, at pressure, cause the pyrolysis and gasification of the biomass into char, gases 28 and tars 30; raw gas 28 containing tars 30, and fine char eventually exit the gasifier, typically leaving the coarse char behind in the inert sand bed 24, which must eventually be recovered to generate heat. The raw gas 28 containing tars 30 is transferred to a secondary vessel 34 to which oxygen 38 and/or heat 36 is added. Breaking down of the tars 30 occurs within the secondary vessel 34 due to the addition of heat 36 and/or oxygen 38. A lower tar gas 28 is eventually caused to exit the gasifier.

FIG. 5b shows a schematic of a prior art dual-bed gasifier system, which consists of a biomass gasifier 20, a secondary tar reduction vessel 21 in which heat and/or catalyst is added, and a char combustor 37 in which this extra heat is generated. In the gasifier, heat and steam cause the pyrolysis of the biomass 26, into char 27, gases 28 and tar 30. Coarse char 27 exits the gasifier bed with bed material 25, and passes to the combustor vessel 37. Air enters the combustor vessel to burn the char, producing heat which raises the temperature of the bed material 25H above its value when in the gasifier. The hotter bed material from the combustor provides heat to both the secondary tar reduction vessel and the gasifier.

Figure 6:
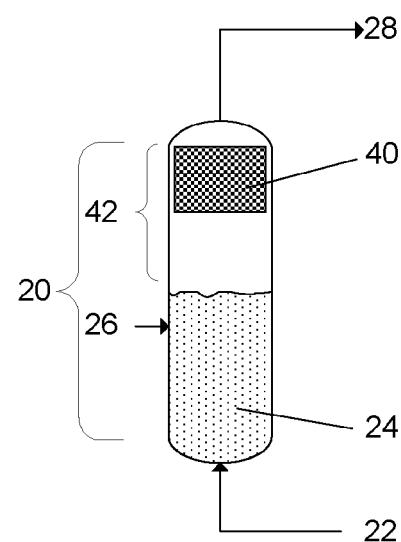
FIGS. 6-7b show schematics of biomass gasifiers of the present invention.

FIG. 6 shows a schematic of a biomass gasifier 20 having a free-board tar destruction unit 40 of the present invention. Steam 22 enters the gasifier 20 and is forced through inert sand bed 24. Biomass 26 is fed into the inert sand bed 24. The gasifier 20 is moderately heated. The heat and steam, at pressure, cause the pyrolysis and gasification of the biomass into char, gases 28 and tars 30; the gases 28 and tars 30 move through the free-board 42 where they come into contact with the free-board tar destruction unit 40 which is affixed to the inside of the gasifier 20, in the free-board 42. The free-board tar destruction unit 40 is filled with, or coated in, a known catalyst for the cracking or steam reforming of tar 30. Thus, as the tar 30 passes through the free-board 42, it comes into contact with the catalyst contained within or coating the free-board tar destruction unit 40, causing cracking or steam reforming of the tar. Eventually, a lower tar gas 28 is caused to exit the gasifier.

Figure 7:
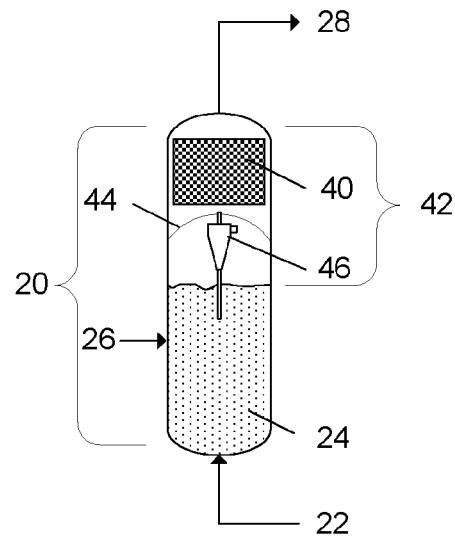

FIG. 7 shows a schematic of a biomass gasifier 20 having a free-board tar destruction unit 40 of the present invention, having the further advantage of creating a cyclone effect for the forcing of gas through the free-board tar destruction unit. Steam 22 enters the gasifier 20 and is forced through inert sand bed 24. Biomass 26 is fed into the inert sand bed 24. The gasifier 20 is moderately heated. The heat and steam, at pressure, cause the pyrolysis and gasification of the biomass into char, gases 28 and tars 30. Gasifier 20 has a barrier 44 between the section containing the inert sand bed 24 and the free-board 42. The barrier 44 prevents gas from passing between these two sections of the gasifier 20, except through an aperture on one side of cyclone funnel 46. Gas 28, tar 30, and fine char or sand particles are forced through cyclone funnel 46, causing a cyclonic effect in the gas 28, that removes the fine particles from the gas and tar which would otherwise deposit on the catalyst, reducing its efficiency. This enhances catalytic action when the particle-free gas 28 is then transferred to the free-board 42 and through free-board tar destruction unit 40. The gases 28 and tars 30 thus move through the free-board 42 in a cyclone, and come into contact with the free-board tar destruction unit 40 which is affixed to the inside of the gasifier 20, in the free-board 42. The free-board tar destruction unit 40 is filled with, or coated in, a known catalyst for the cracking or steam reforming of tar 30. Thus, as the tar 30 passes through the free-board 42, it comes into contact with the catalyst contained within or coating the free-board tar destruction unit 40, causing cracking or steam reforming of the tar. Eventually, a lower tar gas 28 is caused to exit the gasifier.

Figure 7B:
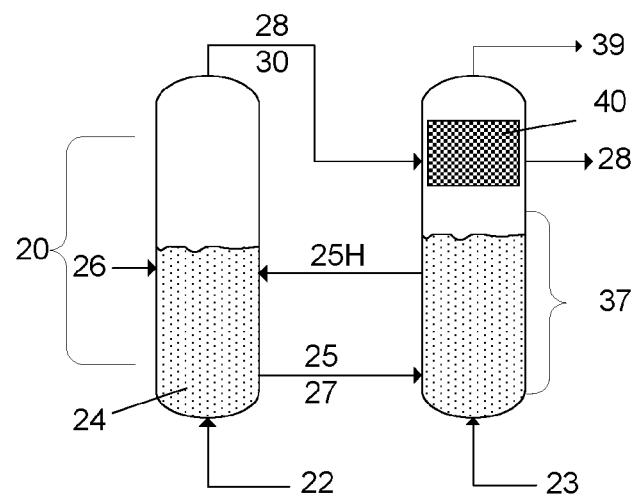
Figure 8A:
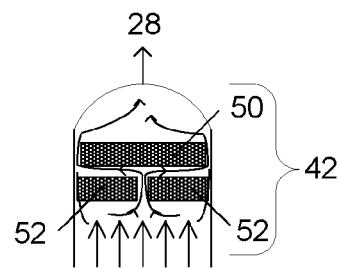
FIGS. 8-8d show a schematic of a free-board catalytic or heat source of the present invention.
Figure 8B:
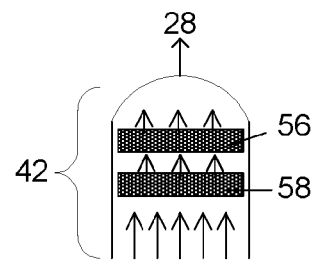
Figure 8C:
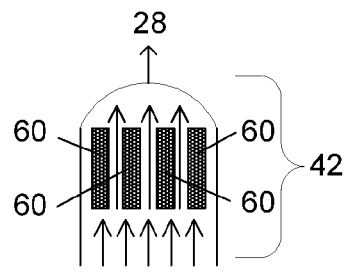
Figure 8D:
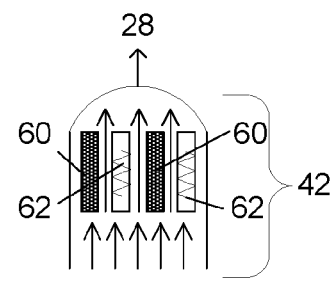

FIG. 7b shows a schematic of a biomass gasifier 20 in a dual bed gasifier system, where the freeboard tar destruction unit of the present invention is mounted in the combustor unit 37 freeboard, rather than in the gasifier. Biomass 26 is fed into the bed solids 24 of the gasifier 20. The heat causes pyrolysis and gasification of the biomass into char 27, gases 28 and tars 30. The coarse char 27 and gasifier bed material 25 flow into the combustor vessel 37, where the char is burned with air 23, producing a hot flue gas 39, and the temperature of the bed material is raised above that which existed in the gasifier. The hot bed material from the combustor 25H, is re-circulated to the gasifier, providing heat for the biomass gasification. The hot flue gases 39 provide extra heat for the tar destruction reactions, by flowing over the surfaces of the tar destruction unit. The tar destruction unit is sealed against the gases in the combustor unit, such that the gases and tar to be treated are not mixed or co-mingled with the flue gases from the combustor vessel. The gases 28 and tar 30 to be treated are thus heated indirectly by the flue gases of the combustor, which promotes increased steam reforming and cracking, and yields an essentially tar-free product gas 28.

FIG. 8 shows various configurations of free-board tar destruction unit 40. The free-board tar destruction unit 40 can be configured in a radial flow catalyst bed, as shown in FIG. 8a. This shows radial flow catalyst elements 50, 52, 54, which can be configured in a variety of configurations. The free-board tar destruction unit 40 can also be configured in a flow-through horizontal catalyst component as shown in FIG. 8b, with flow-through catalyst elements 56, 58. The free-board tar destruction unit 40 can also be configured in a bayonet vertical catalyst component as shown in FIG. 8c, with vertical catalyst components 60. Alternatively, the free-board tar destruction unit 40 can have both catalyst and heating components, as shown for example in FIG. 8d, where the free-board tar destruction unit 40 is fitted with both vertical catalyst components 60, and vertical heater components 62, in an array.

Thus, the free-board tar destruction unit can be configured for radial and axial flow orientations, with parallel or series catalyst or heating components. Although only fixed catalyst beds are shown, it would be contemplated to have moving or fluidized beds mounted in the free-board tar destruction unit. The free-board tar destruction unit can also contain different catalytic materials in different elements of the catalyst compartments, in order to maximize tar destruction. Guard-bed configurations, or graduated particle sizes of catalyst within compartments, to minimize fine dust accumulation on the upstream catalyst surfaces, can also be achieved. Once-through, throw-away catalysts, or engineered catalysts, or both, may be used in the free-board tar destruction unit, as can dual catalytic materials, for example, a blend of calcined calcite and wood char, or calcined catalyst and steam reforming catalyst.

The free-board tar destruction unit 40 can be designed to be easily affixed and removed from the free-board 42, using known means. In dual-bed gasifier systems, the tar destruction unit can be fixed either within the gasifier vessel freeboard, or the combustor vessel free-board. In the latter case tar destruction unit is sealed in a manner that the flue gases from the combustor flow over the surfaces of the tar-destruction unit and the gases and tar to be treated flow inside the tar-destruction unit.

The Freeboard Tar Destruction Unit is exemplified in the following examples.

Example 1

Construction of a Bench-Scale Gasifier Having a Freeboard Tar Destruction Unit

Figure 9:
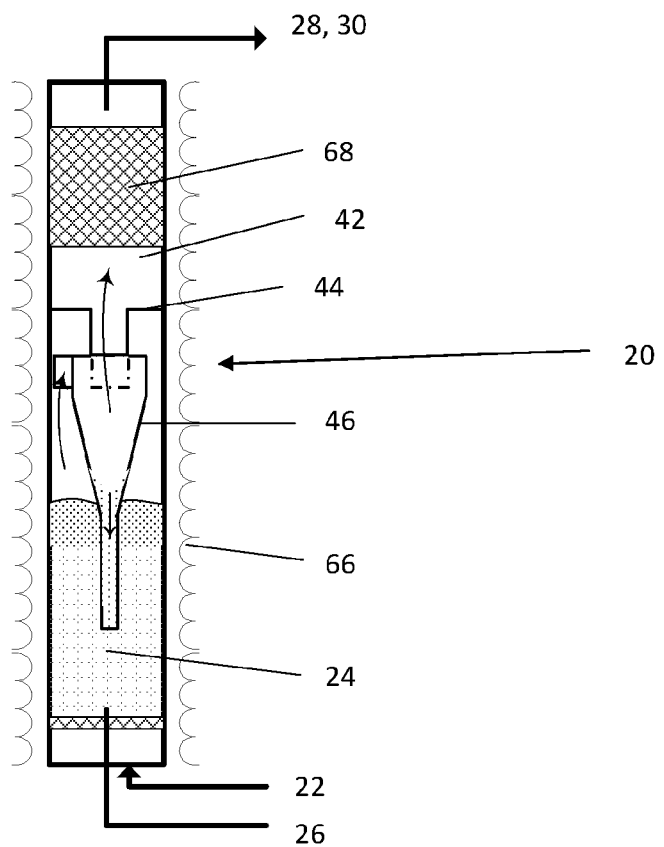
FIG. 9 shows a schematic of a bench scale biomass gasifier of a further embodiment of the present invention.

A bench-scale gasifier having a freeboard tar destruction unit and configured according to the present invention was constructed. FIG. 9 shows a schematic of such a bench-scale, 1-3 kg biomass/hr bubbling fluid bed gasifier. The bench-scale gasifier was constructed and operated under a number of conditions to demonstrate the performance of the improved design disclosed herein. The bench-scale gasifier 20 has a configuration similar to that disclosed for a full-scale gasifier in FIG. 7. Steam 22 enters the gasifier and is forced through inert sand bed 24. Biomass 26 is fed into the inert sand bed 24. The gasifier 20 is moderately heated using heater 66. The heat and steam, at pressure, cause the pyrolysis and gasification of the biomass 26 into char, gases 28 and tars 30. The gasifier 20 has a barrier 44 between the section containing the inert sand bed 24 and the free-board 42. Barrier 44 prevents gas between the section containing the inert sand bed 24 and the free-board 42. The barrier 44 prevents gas from passing between these two sections of the gasifier 20, except through an aperture on one side of cyclone funnel 46. Gas 28, tar 30, and fine char or sand particles are forced through cyclone funnel 46, causing a cyclonic effect in the gas 28, that removes the fine particles from the gas and tar which would otherwise deposit on the catalyst contained within a catalyst cage 68, which would reduce the catalyst's efficiency. Catalyst cage 68 contains a known catalyst for the cracking or steam reforming of tar. As prepared, the catalyst cage is a single compartment, axial flow catalyst bed, however, as described above, other catalyst cage configurations could be utilized. As tar 30 passes through the free-board 42, it comes into contact with the catalyst contained within the catalyst cage 68, causing cracking or steam reforming of the tar. Eventually, a lower tar gas 28 is caused to exit the gasifier.

The bench scale gasifier comprised a catalyst cage 68, which was a wire cage able to contain particles of a few millimeters in diameter, and positioned so that any gas flowing through the gasifier would need to flow through the catalyst cage 68. Inert sand bed 24 was made from silica, and/or olivine sand. The hot gas stream was sampled for tar content via a sampling train (not shown), downstream of an external cyclone (not shown), and according to accepted procedures.

Efficiency of the freeboard tar destruction unit was calculated from the reduction in tar content of the produced gas when the freeboard catalyst cage was in place, compared to the tar content of the gas in experiments without the freeboard catalyst cage in place. In addition, efficiency was calculated in reduction in tar content of the produced gas as compared to a 'control' bench-scale gasifier, which was also constructed and operated. The "control" gasifier had approximately the same capacity and dimensions as the bench-scale gasifier described above, but with the configuration as described in FIG. 1 (i.e. no barrier, no cyclone, and no catalyst chamber).

Tar concentration was measured in accordance with the International Energy Agency provisional protocol (Simell, P., et al., (1998) "Provisional protocol for the sampling and analysis of tar and particulates in the gas from large-scale biomass gasifiers" *Biomass and Bioenergy*, vol. 18, pp. 19-38, incorporated herein in its entirety).

Example 2

Tar Analysis on Bench-Scale Gasifier Having Internal Cyclone

The bench-scale gasifier as described in Example 1 was used to gasify biomass. The biomass was first analyzed and found to contain, in weight % on a dry, ash-free basis: C=47.9%; H=6.4%; O=44.6%; N=0.3%; S=0.8%. The proximate analysis on a weight %, as received basis was: moisture=5.9%; volatile matter=78.6%; Fixed carbon=14.5%; Ash=1.0%.

The gasifier was used to gasify the biomass, using the methodology described above, and the tar levels in the produced biogas was measured. The gasifier was used in two configurations: (1) a "control", where the gasifier had no barrier, no cyclone, and no catalyst cage, which approximated the prior art configuration as shown in FIG. 1; (2) a "cyclone, no catalyst" configuration, where the gasifier had a barrier, cyclone, and catalyst cage, as described in FIG. 9, but with a catalyst cage that was empty of catalyst. The conditions of the gasification were measured, including the gasifier bed temperature, the catalyst cage temperature (or, in the case of the "control", the temperature in the freeboard where the catalyst cage would normally reside), and the tar concentration in the produced gas, for an approximately equal amount of biomass converted. The results were summarized in Table 1.

TABLE 1

| | Gasifier | |
| --- | --- | --- |
| | Control | Cyclone, no catalyst |
| Conditions | No barrier No cyclone, No catalyst cage | Barrier Internal cyclone Empty Cage |
| Gasifier bed temperature (° C.) | 750-785 | 745 |
| Freeboard or cage temperature (° C.) | 957 | 1013 |
| Cage contents | No cage | Empty |
| Cage depth (m) | 0 | 0.18 |
| Tar concentration in produced gas (g/m3) | 57 | 38 |
| % Reduction in Tar concentration | Base Case | 33% |
| HB Run No. | 11/13 avg. | 15 |

As shown in Table 1, the presence of the internal cyclone, even with an empty catalyst cage, reduced produced tar levels by 33%. This reduction was thought to be due to the beneficial effects of the presence of the internal cyclone, which recycled char to the fluid bed and provided increased contact of vapours with char, as well as the higher free-board temperature.

Example 3

Tar Analysis on Bench-Scale Gasifier Having Internal Cyclone

The bench-scale gasifier as described in Example 1 was used to gasify biomass. The biomass was first analyzed and found to contain, in weight % on a dry, ash-free basis: C=47.9%; H=6.4%; O=44.6%; N=0.3%; S=0.8%. The proximate analysis on a weight %, as received basis was: moisture=5.9%; volatile matter=78.6%; Fixed carbon=14.5%; Ash=1.0%.

The gasifier was used to gasify the biomass, using the methodology described above, and the tar levels in the produced biogas was measured. The gasifier was used in two configurations: (1) a "control", where the gasifier had no barrier, no cyclone, and no catalyst cage, which approximated the prior art configuration as shown in FIG. 1; (2) a "cyclone, no catalyst" configuration, where the gasifier had a barrier, cyclone, and catalyst cage, as described in FIG. 9, with a catalyst cage containing a non-catalytic, inert material (ceramic particles). The conditions of the gasification were measured, including the gasifier bed temperature, the catalyst cage temperature (or, in the case of the "control", the temperature in the freeboard where the catalyst cage would normally reside), and the tar concentration in the produced gas, for an approximately equal amount of biomass converted. The results were summarized in Table 2.

TABLE 2

|  | Control | Cyclone, no catalyst |
|---|---|---|
| Conditions | No barrier<br>No cyclone<br>No catalyst cage | Barrier<br>Internal cyclone<br>Catalyst cage filled with inert, non-catalytic material |
| Gasifier bed temperature (° C.) | 830 | 830 |
| Freeboard or cage temperature (° C.) | 846 | 1009 |
| Cage contents | No cage | Inert ceramic |
| Cage depth (m) | 0 | 0.18 |
| Tar concentration in produced gas (g/m3) | 42 | 36 |
| % Reduction in Tar concentration | Base case | 14% |
| HB Run No. | 21 | 16 |

As shown in Table 1, the presence of the internal cyclone, even with a catalyst cage filled with an inert material, reduced produced tar levels by 14%. This reduction was thought to be due to the beneficial effects of the presence of the internal cyclone, which recycled char to the fluid bed and provided increased contact of vapours with char, as well as the higher free-board temperature.

Example 4

Tar Analysis on Bench-Scale Gasifier Having Internal Cyclone and Lime Catalyst

The bench-scale gasifier as described in Example 1 was used to gasify biomass. The biomass was first analyzed and found to contain, in weight % on a dry, ash-free basis: C=47.9%; H=6.4%; O=44.6%; N=0.3%; S=0.8%. The proximate analysis on a weight %, as received basis was: moisture=5.9%; volatile matter=78.6%; Fixed carbon=14.5%; Ash=1.0%.

The gasifier was used to gasify the biomass, using the methodology described above, and the tar levels in the produced biogas was measured. The gasifier was used in three configurations: (1) a "control", where the gasifier had no barrier, no cyclone, and no catalyst cage, which approximated the prior art configuration as shown in FIG. 1; (2) a "cyclone, catalyst, high temperature" configuration, where the gasifier had a barrier, cyclone, and catalyst cage, as described in FIG. 9, with a catalyst cage containing calcined limestone (lime) particles, a low-cost catalytic material, where the lime particles were at a relatively higher temperature of 1025° C.; (3) a "cyclone, catalyst, medium temperature" configuration, identical to configuration (2), but with the lime particles at a slightly lower temperature of 974° C. The conditions of the gasification were measured, including the gasifier bed temperature, the catalyst cage temperature (or, in the case of the "control", the temperature in the freeboard where the catalyst cage would normally reside), and the tar concentration in the produced gas, for an approximately equal amount of biomass converted. The results were summarized in Table 3.

TABLE 3

|  | Control | Catalyst, high temp | Catalyst, med temp |
|---|---|---|---|
| Conditions | No barrier<br>No Internal Cyclone<br>No catalyst cage | Internal cyclone, barrier<br>Catalyst cage containing lime at high temperature | Internal cyclone, barrier,<br>Catalyst cage containing lime at medium temperature |
| Gasifier bed temperature (° C.) | 820 | 810 | 820 |
| Freeboard or Cage temperature (° C.) | 846 | 1025 | 974 |
| Cage contents | No cage | Lime (calcined) | Lime (calcined) |
| Cage bed depth (m) | 0 | 0.18 | 0.18 |
| Tar concentration In produced gas (g/m3) | 42 | 28 | 9 |
| % Reduction in tar concentration | 0 | 33% | 79% |
| HB Run no. | 21 | 17 | 18 |

As can be seen in Table 3, two comparisons were made, where the gasifier was operated at bed temperatures of 810-820° C. As would be understood to a person of skill in the art, gasifier bed temperatures of 820° C. and 810° C. were very similar temperatures, and likely meant similar to identical conditions within the gasifier. At this temperature, control gasifier conditions (no cyclone, no barrier, no catalyst), the produced gas was found to have a tar concentration of 42 g/m$^3$. However, when an 0.18 m deep bed of lime was placed in a catalyst cage, maintained at 1025° C., the produced gas tar concentration was 28 g/m$^3$, a reduction in tar levels of 33%. When this same catalyst was placed in a catalyst cage, maintained at 974° C., the tar concentration was reduced to 9 g/m$^3$—a tar reduction of 79%. It is thought that, at excessively high lime bed temperatures, lime undergoes "burning" or collapse of surface area and pore size via grain sintering, whereas at lower temperatures, the lime maintains its pore structure, and is thus more reactive. Tests showed that the average specific surface of the lime after gasification was higher in the medium temperature group as compared to the high temperature group.

Table 3 illustrates the effectiveness of tar reduction with a low-cost material, lime, in the freeboard catalyst cage. It would be understood to a person of skill in the art that conditions could be further optimized by utilizing different bed depth, lime particle size, lime bed temperature, and type of lime used.

Example 5

Tar Analysis on Bench-Scale Gasifier Having Internal Cyclone and Commercial Catalyst The bench-scale gasifier as described in Example 1 was used to gasify biomass. The biomass was first analyzed and found to contain, in weight % on a dry, ash-free basis: C=47.9%; H=6.4%; O=44.6%; N=0.3%; S=0.8%. The proximate analysis on a weight %, as received basis was: moisture=5.9%; volatile matter=78.6%; Fixed carbon=14.5%; Ash=1.0%.

The gasifier was used to gasify the biomass, using the methodology described above, and the tar levels in the produced biogas was measured. The gasifier was used in two configurations: (1) a "control", where the gasifier had no barrier, no cyclone, and no catalyst cage, which approximated the prior art configuration as shown in FIG. 1; (2) a "cyclone, catalyst, high temperature" configuration, where the gasifier had a barrier, cyclone, and catalyst cage, as described in FIG. 9, with a catalyst cage containing RK-212 (Haldor-Topsoe Ltd., Denmark), a commercial catalyst normally used for steam reforming of naphthas, having a particle size of 1.7-6 mm. It would be understood to a person of skill in the art that other catalysts could be used, for example, other naphtha steam reforming catalysts known in the art. The RK-212 catalyst used had the following range of compositions, in weight percent: Ni 12-15%; NiO 0-3%; MgO 25-30%; $K_2O$ 1-2%; CaO 1-4%; $Al_2O_3$ 60-65%. The conditions of the gasification were measured, including the gasifier bed temperature, the catalyst cage temperature (or, in the case of the "control", the temperature in the freeboard where the catalyst cage would normally reside), and the tar concentration in the produced gas, for an approximately equal amount of biomass converted. The experiment was repeated at two different gasifier temperatures, with results summarized in Table 4. Catalyst was loaded into the catalyst cage to a depth of 0.18 m, and the catalyst was conditioned in hot hydrogen before gasification.

TABLE 4

| | Gasifier | | | |
|---|---|---|---|---|
| | Control | Catalyst, low temp gasifier | Control | Catalyst, high temp gasifier |
| Conditions | No barrier No internal cyclone No catalyst cage | Barrier Internal cyclone catalyst cage containing RK-212 | No barrier No internal cyclone No catalyst cage | Barrier Internal cyclone Catalyst cage containing RK-212 |
| Gasifier Bed temperature (° C.) | 757 | 766 | 805 | 807 |
| Freeboard temperature (° C.) | 918 | 919 | 846 | 944 |
| Freeboard cage contents | None | RK-212 | None | RK-212 |
| Freeboard Bed Depth (m) | None | 0.18 | None | 0.18 |
| Tar Concentration in Produced gas (g/m3) | 57 | 3.9 | 42 | 1.8 |
| % Reduction of Tar Concentration | Base case | 93% | Base case | 96% |
| HB Run No. | 11/13 avg. | 19 | 21 | 20 |

At the lower bed temperature (757-766° C.) and a catalyst temperature of 919° C., the tar content of the produced gas was lowered from 57 g/m³ (control) to 3.9 g/m³ (catalyst, internal cyclone and barrier). The percentage reduction in produced gas tar content was therefore 93%. At bed temperatures of 805° C.-807° C., and a catalyst temperature of 944° C., the produced gas tar concentration was reduced from 42 g/m³ (for control) to 1.8 g/m³ (catalyst, internal cyclone and barrier), a reduction of 96%.

As would be understood by a person of skill in the art, optimization of conditions can be readily determined by changing the type of catalyst, increasing the amount of catalyst present, or by adjusting the particle size or temperature of the catalyst.

The invention claimed is:

1. A free-board tar destruction unit for a gasifier, comprising:
    (a) means for affixing a catalyst to the inside of a free-board section of a combustor vessel of a dual bed gasifier system;
    (b) the catalyst.
2. The free-board tar destruction unit of claim 1, further comprising heating means.
3. The free-board tar destruction unit of claim 2, wherein the heating means consists of vertical heating components in an array.
4. The free-board tar destruction unit of claim 1 wherein the catalyst is within a radial flow catalyst bed.
5. The free-board tar destruction unit of claim 1 wherein the catalyst is within a single compartment, axial flow catalyst bed.
6. The free-board tar destruction unit of claim 1 wherein the catalyst is within a plurality of flow-through horizontal catalyst compartments.
7. The free-board tar destruction unit of claim 1 wherein the catalyst is within a plurality of bayonet vertical catalyst compartments.
8. The free-board tar destruction unit of claim 2 wherein the catalyst and heating means are within a plurality of alternating bayonet vertical compartments.
9. The free-board tar destruction unit of claim 1 wherein the catalyst is a naphtha steam reforming catalyst, preferably RK-212.
10. The free-board tar destruction unit of claim 1 wherein the catalyst is lime.
11. A biomass gasifier comprising:
    (a) a particle bed section, having, within it, sand or other chemically inert particles;
    (b) a free-board section, devoid of the particle bed;
    (c) a biomass feeder, capable of feeding biomass into the particle bed section;
    (d) a steam feeder, capable of feeding steam into the particle bed section;
    (e) a catalyst, situated within the free-board section
    (f) a cyclone, between the particle bed section and the free-board section; and
    (g) a barrier between the particle bed section and the free-board section, configured such that a gas passing from the particle bed section to the free-board section must pass through the cyclone.
12. The biomass gasifier of claim 11, further comprising a heat means situated within the free-board section.
13. The biomass gasifier of claim 11 wherein the catalyst is in a flow-through horizontal catalyst compartment.
14. The biomass gasifier of claim 11, wherein the catalyst is in a compact arrangement of catalytic surfaces.
15. The biomass gasifier of claim 11 wherein the catalyst and the heating means are a compact arrangement of catalytic and heating surfaces mounted within the free-board.
16. The free-board tar destruction unit of claim 1, wherein the catalyst is in a compact arrangement of catalytic surfaces.
17. The free-board tar destruction unit of claim 2, wherein the catalyst and the heating means are a compact arrangement of catalytic and heating surfaces mounted within the free-board.

* * * * *